United States Patent [19]
Nakamura et al.

[11] 4,191,494
[45] Mar. 4, 1980

[54] APPARATUS OF EFFECTING BUOYANCY ON SUBMERGED ARTICLES

[75] Inventors: Koji Nakamura, Chigasaki; Masaru Ogata, Yokohama; Takuzo Nakatsuka, Hyogo, all of Japan

[73] Assignees: Shibata Kogyo Co., Ltd, Akashi; Nippon Kokan Kabushiki Kaisha, Tokyo, both of Japan

[21] Appl. No.: 898,768

[22] Filed: Apr. 21, 1978

[30] Foreign Application Priority Data

Apr. 28, 1977 [JP] Japan ................... 52-49462

[51] Int. Cl.² .................. F16L 1/00; F16L 3/00
[52] U.S. Cl. ................. 405/171; 137/116.5; 405/154; 405/162
[58] Field of Search ............. 405/171, 162, 154, 160, 405/173; 137/116.5, 505.42, DIG. 9

[56] References Cited

U.S. PATENT DOCUMENTS

| | | | |
|---|---|---|---|
| 2,602,300 | 7/1952 | Collins | 405/162 X |
| 2,720,887 | 10/1955 | Safford | 137/116.5 |
| 3,420,257 | 1/1969 | Lansky et al. | 137/116.5 |
| 3,538,930 | 11/1970 | Kowalski | 137/116.5 X |
| 3,545,471 | 12/1970 | Taplin | 137/116.5 |
| 3,621,872 | 11/1971 | Fisher | 137/505.42 X |
| 3,727,417 | 4/1973 | Shaw | 405/171 |

FOREIGN PATENT DOCUMENTS 80801 5/1963 France ................... 405/171

Primary Examiner—Dennis L. Taylor
Attorney, Agent, or Firm—Moonray Kojima

[57] ABSTRACT

An apparatus for imparting suitable buoyancy to submerged articles, such as pipelines, to reduce their weight in water and enable efficient movement thereof. The apparatus comprises at least one float comprising air tight material, pipe for supplying pressurized air thereinto, and a differential pressure regulating valve arranged close to the float and connectable to the pipe for regulating the amount of pressurized air supplied to the float dependent upon the difference in pressure between that in the float and a predetermined value. Advantageously, the apparatus is easily transportable, stored and attached to the items to which it imparts the desired amount of buoyancy; the apparatus also keeps constant the buoyancy regardless of the depth of water, thus, enabling easy and safe moving of submerged articles.

8 Claims, 7 Drawing Figures

FIG_1
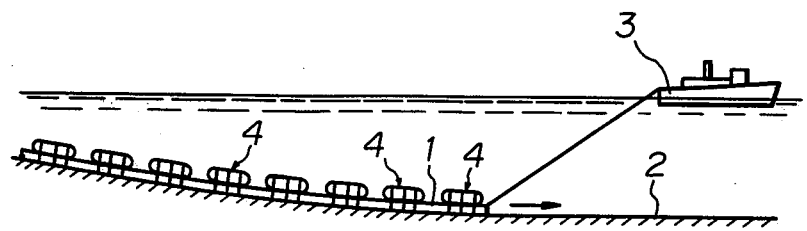
FIG_2
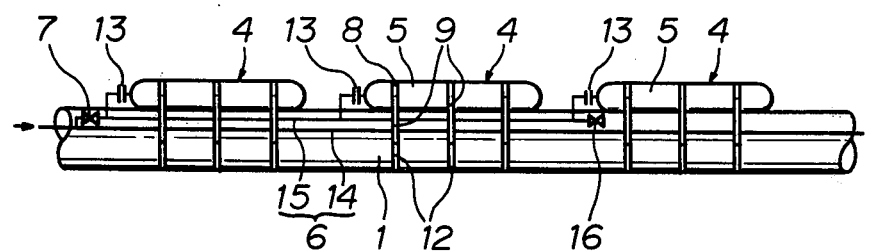
FIG_5
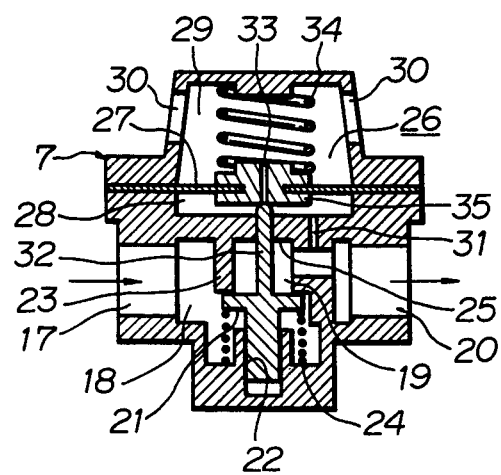

FIG_3
FIG_4
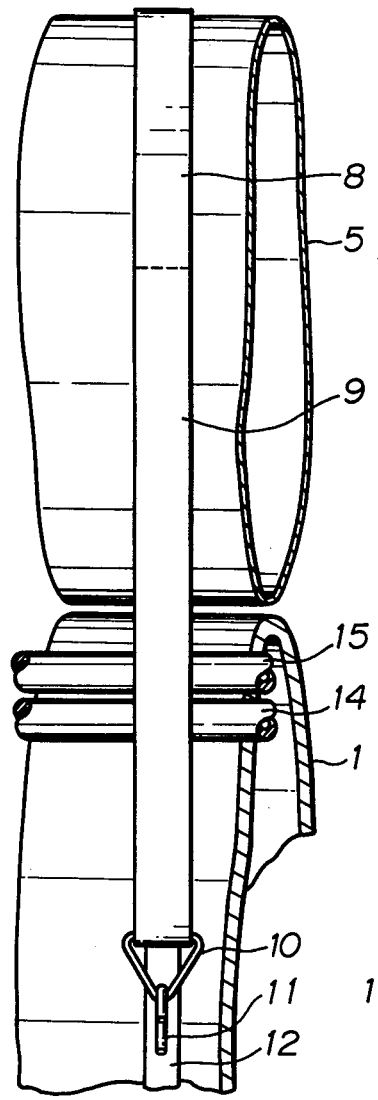
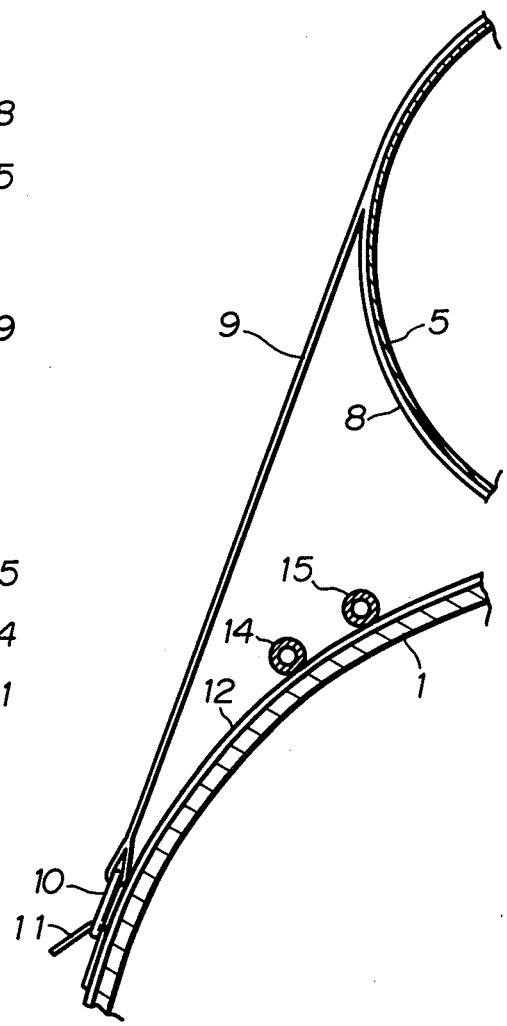

FIG_6
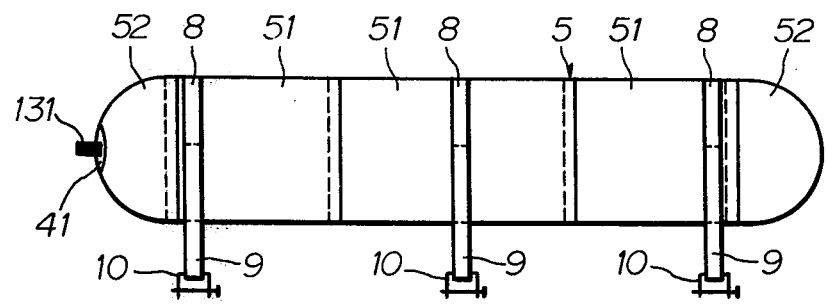
FIG_7
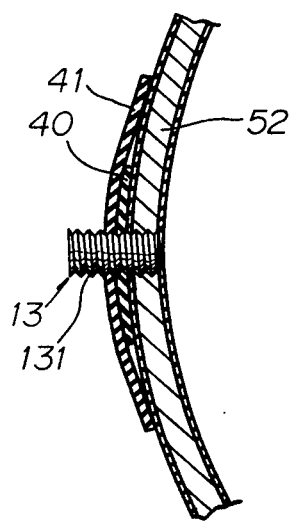

APPARATUS OF EFFECTING BUOYANCY ON SUBMERGED ARTICLES

BACKGROUND OF THE INVENTION

This invention relates to an apparatus for imparting desired amount of buoyancy to submerged articles, and more particularly to an apparatus which give buoyancy to such articles as pipe lines to be laid along the bottom of a body of water, thereby to reduce their weight in water and enable more efficient horizontal and vertical movements thereof.

One method of moving weighty items on the bottom of a body of water, or in the water, such as pipeline laying, is to build a working base on land, connecting the pipes at the base, and then successively drawing the connected pipes to the opposite shore through the water.

When the apparent weight in water of the article being drawn through the water or along the bottom is too light, the article may be moved by surges or currents in the water. The article must therefore be suitably weighted, such as by applying concrete to the outer surfaces thereof. However, conversely, if the apparent weight is too heavy, friction is caused between the article being drawn and the bottom of the water, thereby resulting in difficulties of drawing. In the latter case, means are provided throughout the length of the article being drawn to reduce the apparent weight thereof in water. When the drawing is completed, the buoyancy providing means are removed manually by divers.

One problem in, for example pipe laying, using prior art buoyancy means is in the nature and handling of the buoyancy means. When drawing the pipe line from one shore and along the bottom to the opposite shore, the water pressure changes according to the depth of the water. In order to suitably reduce the weight in water, the buoyancy means should maintain constant the buoyancy irrespective of the water depth or changes in water pressure. Also, on a practical basis, the buoyancy means should be easy to transport, store and attach to the submerged article.

Conventional buoyancy means have comprised floats made of steel pipes having both ends closed air-tight and attached to the pipeline, for example, to give suitable buoyancy thereto. The capacity of the floats having such stiff shells, may be kept constant in spite of the changes of water pressure. However, disadvantageously, the prior floats are expensive, and the weight and volume are large so that transportation expense is high and a large storage space is required. Moreover, it is troublesome to attach the prior floats to the pipeline being laid because of their heavy weight; it is necessary to use large scale loading machines, such as cranes. Also, disadvantageously, when removing the prior stiff shelled means from the article being drawn through the water, the floats tend to rapidly surface through the water due to their large buoyancy, thereby resulting in dangerous possibilities of colliding with machinery and workers.

Another prior buoyancy means uses floats of an air tight bag made of synthetic fibric into which air is filled. This prior means presents no problem in transportation or storage; however, disadvantageously, it is difficult to regulate the buoyancy to counteract changes in water depth. Thus, when this means is attached to the article being drawn, the buoyancy is changed adversely to cause either the article to rise or the article to be dragged by friction. This prior means cannot be used for water depths of more than 20 m.

SUMMARY OF THE INVENTION

The present invention aims to eliminate the foregoing and other deficiencies and disadvantages of the prior art.

An object is to provide an apparatus which retains constant the buoyancy by automatically regulating the inside pressure of the floats to compensate for changes of water pressure due to changes in water depth, and which may always give desired buoyancy to the submerged articles in atmospheric air, or from a shallow depth to large depth or vice versa.

Another object is to provide an apparatus imparting buoyancy to a variety of articles, which is light weight, compact, inexpensive and easy to transport and store.

A further object is to provide a buoyancy apparatus which is easily attached to and detached from submerged articles, such as pipelines, and is easily removed from the article in water after completion of the laying or drawing process.

A still further object of the invention is to provide a buoyancy apparatus which is particularly suited for giving buoyancy to pipelines being laid in water, is widely applicable to oceanic structures or other weighty materials in or through water, and to floating of marine transports at or from or to the bottom of water.

The foregoing and other objects and features of the invention are attained in an apparatus comprising one or more floats, which have bag shapes and are made of soft air tight material and furnished on the outer part thereof with means for attaching same to submerged articles, pipes for feeding pressurized air into the floats, and a differential pressure regulating valve disposed close to the floats. The differential pressure regulating valve regulates the amount of pressurized air supplied to the floats via the pipes, when the difference in pressure between the inside of the floats and the outside is lower than a predetermined value, and when the difference is higher than the predetermined value, it exhausts the air to the outside.

Advantageously, the inventive apparatus utilizes the merits of an air bag of soft material to resolve the problem of fluctuations of inside pressure and buoyancy instability caused by the fluctuations, make possible the maintenance of constant buoyancy imparted to the submerged article, irrespective of the atmospheric pressure and depth of water, and if necessary to almost remove buoyancy in water Other objects and structures and features of the invention will be apparent from the following description.

BRIEF DESCRIPTION OF THE DRAWING

FIG. 1 is an explanatory pictorial view depicting application of the invention in imparting buoyancy to a pipeline being laid along the bottom of a body of water;

FIG. 2 is a partial enlargement of the above embodiment of FIG. 1;

FIG. 3 is a side view depicting structure of the float arrangement of FIG. 2 and attachment thereof to a weighty article in water;

FIG. 4 is a partial front view of the embodiment of FIG. 3;

FIG. 5 is a cross-sectional view depicting an illustrative differential pressure regulating valve utilized in the invention;

FIG. 6 is a side view depicting an illustrative float according to the invention; and FIG. 7 is an enlarged view of the connection shown in FIG. 6.

DETAILED DESCRIPTION OF PREFERRED EMBODIMENTS

Turning to FIG. 1, there is depicted a pipe line 1 being laid along the bottom 2 of a body of water and towed from the left shore toward the right shore (see arrow) by a tugboat 3. The pipeline comprises a plurality of section and is assembled first at a base location on the left shore prior to the drawing operation. The buoyancy apparatus according to the invention 4 is connected to the pipe line prior to drawing.

FIGS. 2 to 5 depict in further detail the illustrative apparatus 4, which as shown in FIG. 2, is formed with a soft air-tight material in a bag shape, and is provided as floats 5 to be attached to the pipeline 1. A pipe 6 is provided for supplying pressurized air (from a source not shown) into floats 5. A differential pressure regulating valve 7 is provided close to one of the floats such as the left float in communication with pipe 6.

The floats 5 are cylindrical in shape and are of air tight construction. They are preferably of rubber or synthetic fabric coated with synthetic resin as a basic material. Both end are sealed air tight. The basic material is preferably of plain fabric of 1280 to 1820 deniers, such as nylon, vinyl or Tetoron. The surface of the basic cloth is coated with a thin film of natural or synthetic rubber or synthetic resin. The scale and number thereof are designed in accordance with the weight and volume of the article in the water, to be imparted with suitable buoyancy. When making a large float, a plurality of cylindrical basic cloths 51 (FIG. 6) are connected in an overlapping manner and the basic cloths 52 of a cap shape are interconnected as depicted. If the article in water is a pipeline, the floats are prepared in sufficient number to enable imparting of sufficient buoyancy to the number, weight and length of pipes. The floats may be attached onto the pipes at a suitable distance from each other.

As depicted in FIG. 2 or FIG. 4, the float 5 is wound with reinforcing bands 8 at suitable outer parts thereof, for detachably attaching to, for example, pipelines. Attaching band 9 extends from both ends of each reinforcing band 8 and has catching or connecting means 10 (FIGS. 3,4,6) at its ends for attachment to the pipeline 1. The shape of the catching means may be selected arbitrarily; in the depicted example, it is triangular. Pipeline 1 has a receiving catch 11 (FIG. 3,4) at parts corresponding to the catching means 10, and in the depicted example, such receiving catch 11 is a hook. The hook 11 is preferably welded to a steel band 12 (FIG. 3) wound on the outer circumference of the pipe corresponding to the attaching band 9. The float 5 has a connection 13 (FIG. 2,6,7) disposed at its end to pipe 6.

The end structure is depicted in greater detail in FIG. 7 wherein the cap shaped base cloth 52 is attached at its hole with a rubber plate 40 screwed with a connecting metal 131. Rubber cover 41 is attached to the outer circumference.

The pipe 6 is used to supply pressurized air from a source not shown into the floats 5 via valve 7 and connections 13. Since the article, such as pipeline 1, to which buoyancy is to be imparted may differ in shape, the pipe 6 may differ in configuration. In this embodiment using a pipe line 1, pipe 6 is comprised of a stem pipe 14 disposed along pipeline 1 from the left shore, and a branch pipe 15 having a valve 16 (FIG. 2) disposed at one end thereof and connected to step pipe 14 via valve 7. The pipe 15 is also connected to the floats at the connections 13. Pipes 6 may be of rubber or steel or other suitable material. When the pipes 6 are made of metal, such as steel, they may be welded to the outer periphery of the pipeline 1, or welded to the steel bands 12 (see FIG. 4). When pipes 6 are of rubber or other non-metallic material, they may be detachably held by means of appropriate means at the same positions.

The differential pressure regulating valve 7 is connected to pipes 6 and is located close to float 5. It automatically regulates the inside pressure of float 5. If the difference in pressure between the inside of float 5 and the outside is lower than a predetermined value, pressurized air is supplied into float 5. Conversely, if the difference is higher than the predetermined value, the air in the float is exhausted into the water or atmosphere.

The structural details of the regulating valve 7 are shown in FIG. 5. Valve 7 is defined with an inlet port 17 in communication with pipes 6 (namely branch pipe 14 in the depicted example) and with an outlet port 20 in communication with floats 5, as well as a valve room 18 having a valve disc 21 and a valve disc room 19, disposed between the inlet port 17 and the outlet port 20. The valve disc 21 is slidable within a guiding concave 22 formed at the lower part of the valve room 18 and the valve disc room 19. Within the valve room 18 is a valve seat 23 to contact valve disc 21, is protruded from the upper part, and around the concave 22 a spring 24 is arranged to moderately push the valve disc 21 to the valve seat 23.

There is defined a room 26 with a partition 25 upwards of the valve seat room 19. The room 26 is provided with a diaphragm 27 so that the room 26 is divided into a lower diaphragm room 28 and an upper spring room 29. The spring room 29 is formed with windows 30 communicating with the outside. The partition 25 is formed with a hole 31 to communicate the diaphragm room 28 with the valve seat room 19. The valve disc 21 is provided at its upper portion with a valve stem 32 which protrudes through the partition 25 into the diaphragm room 28. The diaphragm 27 has a hole 33 at its center to provide communication between the diaphragm room 28 and spring room 29. The hole 33 is formed coaxially with valve stem 32. Spring 34 is provided in spring room 29, which pushes the diaphragm 27 to diaphragm room 28 to close hole 33 by means of valve stem 32.

The strength of spring 34 is determined such that when the pressure of the diaphragm room 28 exceeds by a small amount the pressure of spring room 29 (for example 0.5 kg/cm$^2$), the diaphragm 27 is balanced. Thus, the desired pressure may be determined by using spring 34 of a particular strength, and its practical range is preferably about between 0.3 to 1.0 kg/cm$^2$. The reason alower limit of 0.3 kg/cm$^2$ was selected is that a lower strength would render the spring unfunctionable or at best difficult to function. The upper limit was selected because greater strength is difficult to maintain in production of floats having soft properties and high strength. Hole 33 of diaphragm 27 may be directly formed in the diaphragm like a film, but inorder to precisely close the hole and keep the spring 34 stable, the present example uses a middle piece 35 in the diaphragm which is formed with the hole 33 and is caused to serve as a receiving seat for one end of the spring 34.

In laying the pipeline 1, work is done on shore prior to drawing. Steel bands 12 are wound onto the pipes. Successive segments of pipes are connected together to form the pipeline 1. Pipes 6 are arranged along the pipeline 1; floats 5 are suitably positioned along the pipeline at suitable distances from each other, by engaging the catch means 10 disposed on bands 9 with receiving catches 11 to connect the floats to the pipeline 1. Branch pipe 15 is connected to floats 5 through connections 13. The foregoing attachment process can be readily and easily carried out since the floats are light in weight.

Assuming that a part of pipeline 1 is on land together with floats 5 and pipe 6 is filled with pressurized air, the inside of the floats would be under atmospheric pressure. Thus, rooms 28,29 of the diaphragm 27 would be both under atmospheric pressure, so that valve disc 21 descends separately from the valve seat 23 and opens by the pressure force of the spring 35 against the pressure of spring 24. Accordingly, pressurized air is fed into float 5 from outlet port 20 via inlet port 17, valve room 18 and valve seat room 19 to expand the float. When the inside pressure of float 5 reaches the desired value, e.g. a pressure of 0.5 kg/cm$^2$, the inside pressure of the float reaches the interior pressure of chamber 28 so that the diaphragm is balanced. The valve disc 21 again contacts the valve seat 23 to check the pressurized air flowing into float 5. Then, the catch band 9 is tensed by expansion of the float 5 and the catch means 10 is not easily removed from receiving catch 11.

When pipeline 1 is drawn along the bottom of the water, as shown in FIG. 1, and the floats 5 are also submerged, water floods into spring room 29 from windows 30 so that the diaphragm 27 is again unbalanced and it is deformed toward room 28, whereby the valve disc 21 is pushed down and pressurized air is caused to flow into floats 5. When air pressure exceeds the water pressure by a predetermined value, the diaphragm is balanced and the valve disc 21 closes. Thus, when pipeline 1 is moved into deeper water, the diaphragm 27 is subjected to greater water pressure and valve disc 21 opens and closes, by repetition of which the pressurized air is fed into the float, and the air pressure is always kept above the water pressure by the predetermined value. Thus, the pipeline 1 is always given a constant buoyancy even in deep water, shallow water or medium depth water, and is smoothly moved without causing any friction with the water bottom 2.

When pipeline 1 is further drawn along the water bottom toward the opposite shore and floats 5 come gradually towards shallow water, the difference in pressure between the rooms 28 and 29 is less than the predetermined value. At this time, the diaphragm 27 is deformed toward compression of spring 34, whereby the hole 33 is separated from valve stem 32 to provide communication between diaphragm room 29 and spring room 30 by open hole 33. Then valve disc 21 contacts valve seat 23 by pressing force of spring 24 and closes. Thus, pressurized air in float 5 flows into spring room 29 from outlet port 20 via hole 31 and hole 33, and the pressure within floats 5 drops until the difference in pressure from water pressure becomes the predetermined value.

Following the changes of water depth during laying of pipeline 1, the pressure of the float 5 is regulated to be above water pressure by a predetermined value, and floats 5 maintain the same volume. After completion of laying of the pipeline 1, a diver opens valve 16, and the air within float 5 is exhausted into the water and the float volume is reduced. When connection 13 is separated and catch means 10 are taken off from receiving catch 11, floats 5 are separated from the pipeline 1 and surfaces. The speed at which the floats surface is moderate and cause no harm. The buoyancy apparatus may also be removed on land. If the end of pipes 6 is released to the atmosphere, valve disc 21 opens by the difference in pressure between valve room 18 and valve seatroom 19 and the pressurized air within the float 5 is released through pipes 6. Thus, there are two ways of removing the apparatus after completion of operation and any one can be selected according to work demands.

The following is an actual example of the invention.

EXAMPLE

I. The inventive apparatus was used to give buoyancy to a pipeline (appx 5300 m) to be laid on the bottom of a sea and to be used for landing crude petroleum.

II. The pipe was 1066.8 mm $\phi$ in outer diameter and coated with concrete to be 1318.3 mm $\phi$ in outer diameter and 1396 kg/m in weight.

III. The float was cylindrical, of nylon plain cloth coated with natural rubber (FIG. 6) 600 mm $\phi$ in diameter and 4 m in length. The differential pressure regulating was set at 0.5 kg/cm$^2$ of predetermined pressure value and the float was 1175 kg each.

IV. The pipes were connected by welding on land, and the floats were attached thereon at 13 m distance. The pipes were drawn from land to the sea bottom while supplying air into each pipe by using a compressor at 7 kg/cm$^2$. The construction of pipeline was accomplished to the opposite shore without any problems even though the water depth varied from zero depth to 36 meters depth of water.

The above mentioned explanation has referred to the reduction of weight in water of the pipeline. Of course, the invention is not limited to such use. The invention can of course be used to float the submerged article to a desired depth for towing; it also can be used to cause submerged articles to surface.

The foregoing description is illustrative of the principles of the invention. Numerous other variations and modifiations thereof would be apparent to the worker skilled in the art. All such variations and modifications are to be considered to be within the spirit and scope of the invention.

What is claimed is:

1. An apparatus for imparting buoyancy to articles in water, comprising a plurality of submergible floats of bag shape and of soft air-tight material, attaching means disposed on the outer portion of said floats for attaching said floats to said article, pipe means for supplying pressurized air into said floats, and differential pressure regulating valve means disposed between said pipe means and said floats, whereby said valve means controls the amount of air supplied to said floats in accordance with the difference in pressure between the inside of said flaots and the outside thereof with added air being supplied when said difference is lower than a predetermined value and with air being exhausted from said floats when said difference is higher than said predetermined value, wherein said differential pressure regulating valve means comprise inlet port connectable to said pipe means and an outlet port connectable to said float, spring room disposed between said input and output ports and having a valve disc and a valve seat room, a room formed above said valve seat room via a partition in which a diaphragm is furnished to divide into a diaphragm room and a spring room which has windows communicating with the outside, and wherein said partition is formed with a hole to provide communication between said diaphragm room and said valve seat room, said valve disc being formed with a valve stem protruding into said diaphragm room through said partition, said diaphgram having a hole to provide communication between said diaphragm room and said pring room which is equipped with a spring, whereby said diaphragm is pushed toward said diaphragm room so that said communicating hole is closed by means of said valve stem, wherein said spring balances said diaphragm when the pressure of said diaphragm room reaches a predetermined value exceeding the pressure of said spring room.

2. The apparatus of claim 1, wherein said floats are made of rubber or synthetic material coated with synthetic resin, and wherein said floats comprise a connecting means at one end thereof and reinforcing bands disposed about said floats, said reinforcing bands being equipped with an attaching band and attaching means for attaching said floats to said articles.

3. The apparatus of claim 2, wherein said pipe means comprise a stem pipe of sufficient length to extend from land or water surface to said article in water, a branch pipe connected at one end to said differential pressure regulating valve means and to said stem pipe, valve means connected to the other end of said branch pipe and wherein said branch pipe is connected to said connecting means of said floats.

4. The apparatus of claim 3, wherein said pipe means comprise steel pipes, and wherein said steel pipes are welded to steel bands disposed about the outer circumference of said articles.

5. The apparatus of claim 1, wherein said predetermined value is within the range of between 0.3 kg/cm$^2$ and 1.0 kg/cm$^2$.

6. The apparatus of claim 1, wherein said diaphragm comprises a middle piece located at the center thereof, said middle piece being formed with said communicating hole and serving as a receiving seat for one end of said spring.

7. The apparatus of claim 1, wherein said article is a pipeline.

8. The apparatus of claim 7, wherein said pipeline has steel bands disposed on the outer circumference thereof, and wherein said steel bands have receiving catches locking the ends thereof.

* * * * *